Nov. 5, 1940.                J. B. COOPER                2,220,477
                          SEAL FOR METER CABINETS
                          Filed June 6, 1938            2 Sheets-Sheet 1
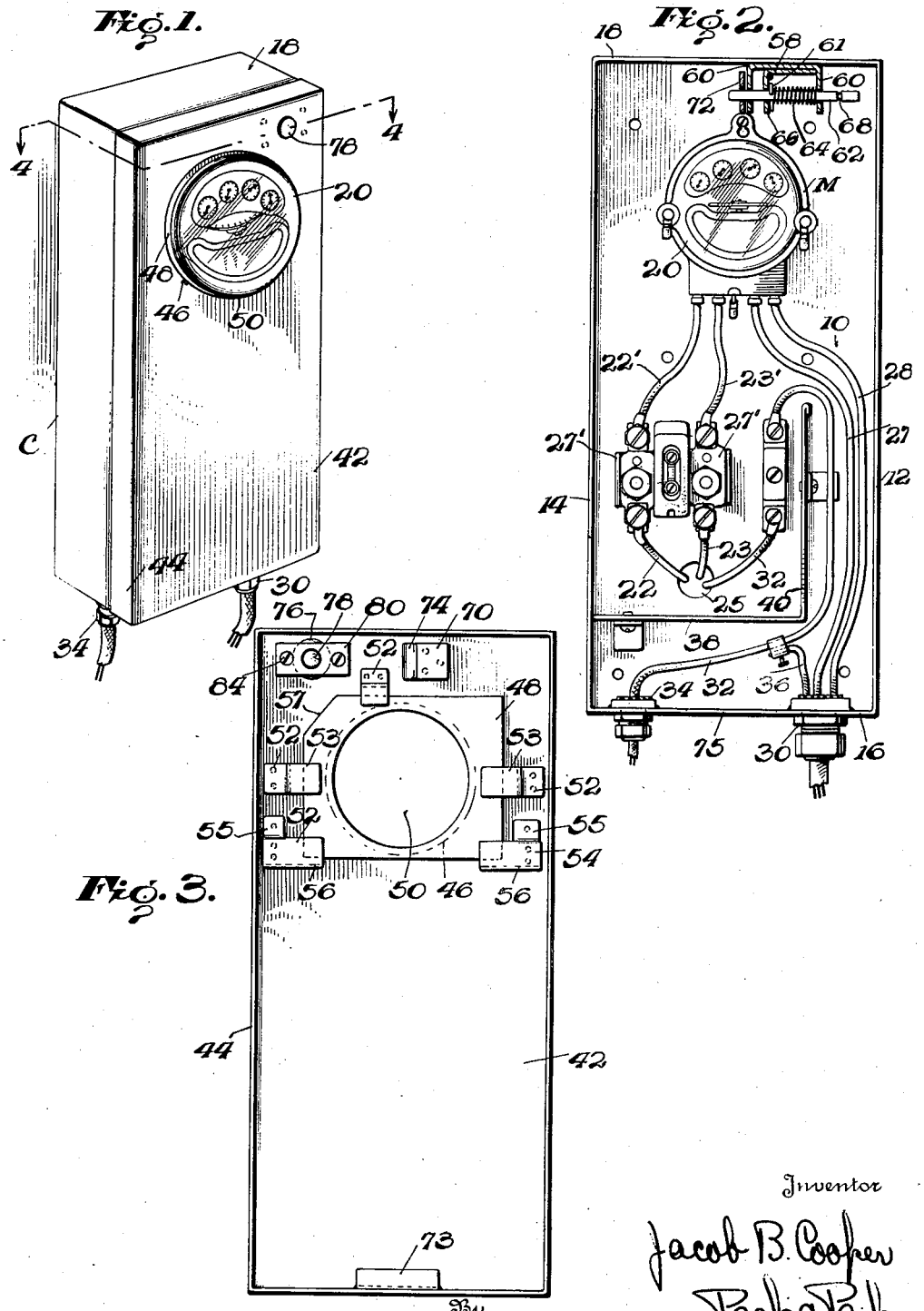

Nov. 5, 1940.          J. B. COOPER                2,220,477
                   SEAL FOR METER CABINETS
                   Filed June 6, 1938          2 Sheets-Sheet 2
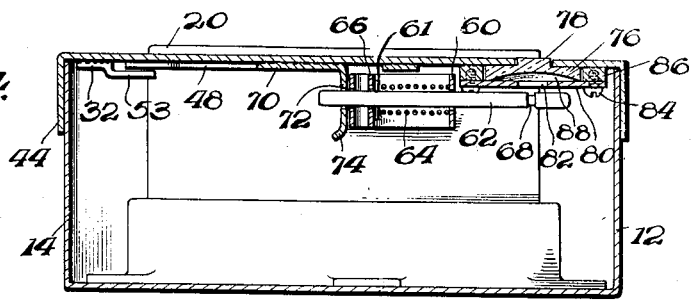
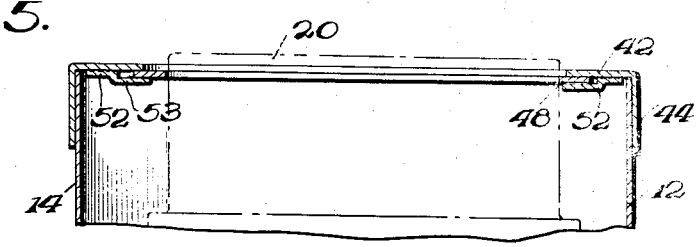
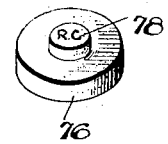
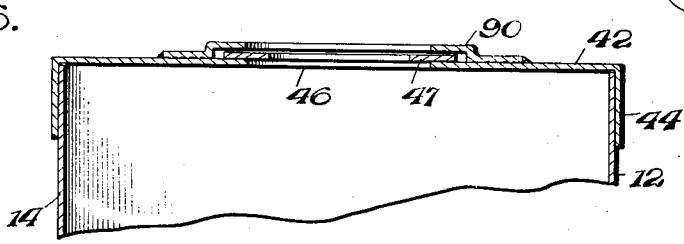
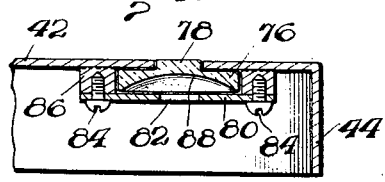
Inventor
Jacob B. Cooper
Peck & Peck
Attorneys Patented Nov. 5, 1940

2,220,477

UNITED STATES PATENT OFFICE 2,220,477

SEAL FOR METER CABINETS

Jacob B. Cooper, Park Ridge, N. J.

Application June 6, 1938, Serial No. 212,153

2 Claims. (Cl. 292—307)

This invention relates to certain improvements in meter cabinets and the nature and objects of the invention will be readily apparent to and recognized by those skilled in the art in the light of the following explanation and detailed description of the accompanying drawings illustrating what I now believe to be the preferred embodiments or mechanical expressions of my invention from among various other forms, designs, arrangements, constructions and combinations of which the invention is capable within the broad spirit and scope thereof.

My present invention embodies improvements in meter cabinets of the general type disclosed in Letters Patent No. 2,117,945, granted to me on May 17, 1938, which is directed to means arranged with an electric meter cabinet for preventing the unauthorized tapping of the electric current power lines to divert current from the cabinet in advance of the electric meter. The means disclosed in said patent are successful in preventing the surreptitious diversion of electric current from the intake line before it is metered, but to further my desire to provide a meter protective device I have found that it is advantageous to provide closure means for the meter cabinet which will promptly indicate to agents or inspectors of the electric or other utility company when the cabinet has been opened, and I have also found that inexpensive and easily operable means must be provided for locking and securing a closure in position upon the cabinet, and for indicating when the meter has been tampered with.

In electric meter cabinets of this type the meter is mounted in position within the cabinet with the dial covering lens or glass face thereof positioned to be readable from the exterior of the cabinet and without requiring the cabinet closure's removal. The cover or closure which is utilized is provided with an opening therein through which the glass or lens of the meter projects so that an agent of the utility company may quickly and easily record the readings therefrom.

For a meter cabinet to be tamper proof it is essential to establish a close fit between the glass globe of the meter and the edges of the aperture which is provided in the cabinet cover. In a great many meter installations the meter itself is mounted within the cabinet so that the lens or glass face is off-center and unless some meter positioning means is provided on the cover about the aperture therein it is difficult if not impossible to dispose the cover on the cabinet so that the edges of the aperture therein substantially conform to the contour of the meter glass. If the meter does not fit snugly within the aperture in the cover it is a relatively simple matter for unauthorized persons to project wires into the cabinet between the glass face and the edges of the aperture in the cover in order to divert current from the cabinet in advance of the meter.

I have overcome this objection by providing means on the cover of the cabinet which is so mounted as to adjust itself to that portion of the meter which projects through the cabinet cover regardless of whether the meter is mounted off-center or not. I have further enhanced the value and operativeness of this means by mounting it in position on the cabinet cover out of tampering range of unauthorized persons.

So that a meter cabinet of this type may truly be tamper proof it is necessary that the closure be locked in position completely covering the interior of the cabinet. Various means have been resorted to in the past but as far as I am aware such means have all been of a type requiring rather expensive or intricate locking means, or mechanism which is mounted outside the cabinet in full view and reach of anyone desiring to tamper therewith in order to obtain access to the cabinet interior. A further fault of the closure securing means of the prior art rests in the possibility of the lock being opened or released by an unauthorized person so that the cover may be removed when desired and placed back on the cabinet in apparently proper position so that an agent or inspector for the owner of the cabinet cannot at a glance without removing the cover discover that the box has previously been opened.

My present invention is designed to and does overcome this deficiency which exists in the meter cabinets now known and in use. I have constructed a locking arrangement which is disposed within the cabinet hidden from the exterior thereof, the locking means so disposed that it may be reached for actuation to releasing position only by fracturing an element disposed on the outside of the box in a permanent position so that its condition or its removal will be quickly and easily visible to an inspector looking at a cabinet with a cover in position thereon. It is by cooperation between the cover locking means and the exteriorly visible member that I am enabled to attain such desired advantages.

When a meter has been mounted in a cabinet such as that disclosed in this application and the cover has been mounted and locked thereon, any removal of the cover from the cabinet for unauthorized purposes and a return of the cover to apparently proper and original position will be easily detected from the exterior of the cabinet due to my design which requires that a frangible member must be shattered and removed from its position visible from the exterior of the box. Hence, an agent of the owner of the meter may at a glance be aware that the cabinet has been tampered with.

The frangible member which is mounted in the cover so as to be exteriorly visible is stamped or impressed on its outside surface with identifying indicia to discourage the fashioning of substitute members for replacing authentic ones which may have been fractured and removed to obtain entrance to the cabinet for illegal purposes. Such markings plainly indicate whether an authentic or a counterfeit member is being used.

A general object of the invention is to prevent the unauthorized opening of a cabinet in which an electric or other meter is mounted, so as to steal or divert current therefrom in advance of the meter.

A specific object of my invention is to provide means in a meter cabinet which will indicate from the exterior thereof when the cover is in position whether it has previously been removed and replaced in apparently proper and original position.

Another object of my invention is to provide a meter cabinet and cover which prevents unauthorized entry into the cabinet between the cover and the meter glass which is mounted to project through the cover.

It is also an object of my invention to provide cover locking means on a meter cabinet box which are inexpensive to manufacture and are mounted within the boxes.

A further object of my invention is to provide a meter cabinet and a cover therefor which adequately and properly fits over a meter when the meter is mounted off-center within the cabinet.

It is a fundamental object of my invention to provide a meter cabinet box which completely encloses the circuit connections within the box and insures that any unauthorized tampering therewith will be visible from the exterior thereof.

With the foregoing general objects and results in view as well as certain others that will be readily apparent from the following descriptions, my invention consists in certain novel and useful features in design and in constructions, arrangements and combination of parts and elements, all as will be more fully and particularly referred to and specified hereinafter.

Referring to the accompanying drawings in which similar reference characters refer to corresponding parts throughout the several figures thereof:

Fig. 1 is a perspective view of a meter cabinet embodying my invention with the cover locked thereon.

Fig. 2 is a view in front elevation of a meter cabinet of my invention with the cabinet cover removed, and showing the cover locking mechanism which is mounted within the cabinet.

Fig. 3 is a view in front elevation of the inside of the cabinet cover, showing particularly the meter glass positioning means mounted thereon and showing the frangible member.

Fig. 4 is a view in section of the meter cabinet taken on the line 4—4 of Fig. 1.

Fig. 5 is a view in vertical section of my invention showing particularly the arrangement of the meter glass positioning means cooperating with the meter glass of an electric meter, the meter being mounted off-center within the cabinet.

Fig. 6 is a view in vertical section showing a modified construction of a meter glass positioning means.

Fig. 7 is a view in vertical section of the frangible member which is mounted on the cabinet cover.

Fig. 8 is a view in perspective of the frangible member alone and removed from the cabinet cover.

In Figs. 1 and 2 of the drawings, I have illustrated by way of example and not of limitation, a form of meter cabinet of my invention adapted to be mounted in vertically disposed position upon a wall of a building or other structure and with the feed or supply wires of the circuit led into the cabinet through a rear wall thereof; and with the load or output wires from the meter within the cabinet led from the cabinet through the lower side wall thereof. In the illustrated example, the meter cabinet C is preferably formed of sheet metal, such for example, as sheet steel or the like of a suitable gauge and embodies the rear wall 10, the opposite side walls 12 and 14 and the opposite end walls 16 and 18.

The meter M is mounted in any suitable manner in the upper portion of the cabinet C with the face or dial enclosed in a globe 20 projecting outwardly from the rear wall of the cabinet to extend through the cabinet closure. In the usual type of meter the indicating dials are enclosed within a glass covering or globe as shown in the drawings, such glass I have designated by the numeral 20 and will hereinafter refer to as the meter glass or lens.

In the form of cabinet and circuit which I have disclosed in Fig. 2 of the drawings the supply wires 22 and 23 enter the cabinet through a conduit 25 formed in the rear wall thereof adjacent a connecting block assembly 27 to which they are electrically connected, and the feed wires 22' and 23' extend therefrom into the meter M. The load wires 27 and 28 extend downwardly from the meter to which they are connected to extend out of the cabinet through an outlet conduit 30 which is provided in the bottom end wall thereof. A neutral wire 32 is also included in the circuit which extends out of the cabinet through the conduit 34 in the lower end wall thereof and a ground wire 36 is adapted to pass from the cabinet through the conduit 30 along with the feed wires 27 and 28.

A horizontal baffle 38 is positioned and secured to the bottom of the cabinet between the outlet conduits 30 and 34 and the connecting block 27 of the circuit and a vertical barrier 40 is disposed on the bottom of the cabinet abutting the inner end of the horizontal baffle to extend upwardly in the cabinet to a point therein above the connecting block assembly. By utilizing such baffles the connecting blocks of the electrical circuit are protected from any wires which might be projected through the various conduits into the cabinet for the purpose of stealing current therefrom in advance of the electric meter M. Such construction is included in my aforementioned patent and forms a part thereof and is shown herein not as a limitation but as one method of protecting the circuit within the cabinet.

For closing the meter cabinet C to completely cover the interior thereof for protection of the electric circuit and assembly means mounted therein I provide a cover 42 having depending flanges 44 which are adapted to extend a short distance about the outer edges of the walls of the cabinet. A gasket or other sealing means formed of suitable material may be provided between the top flanges and the side walls of the cabinet so as to further protect the interior of the cabinet from the effects of moisture and dirt which might gain entrance thereinto between the cover and the side walls of the cabinet. While I have not shown such sealing means in the drawings it is to be understood that such may be used if found desirable, and in a manner as disclosed in my aforementioned patent. An aperture 46 is provided in the cover 42 toward the upper end thereof for the purpose of receiving therethrough the lens or glass portion 20 of a meter M. In this particular instance I have shown the aperture of annular shape to conform to the general contour of the usual lens of an electric meter, however, it is apparent and to be understood that I do not intend to so limit this invention, as it is within the contemplation and scope thereof to utilize this cabinet box with meters of various types which are provided with faces of various shapes. The opening which is formed in the cabinet cover is shaped to conform to the general outline of the lens or glass portion of the meter which in position within the cabinet is adapted to project through the aperture in the cover. It is often the case that a meter as disposed and mounted within the cabinet is off-center and it is then extremely difficult to place the cover on the cabinet with the meter lens projecting through the aperture provided in the cover for that purpose. To solve this problem the aperture in the cover has been made of greater diameter than the diameter of the lens whereby the cover may be passed over the lens and seated on the cabinet. While this is a partial solution to the problem and does permit the cover to be placed in position on the cabinet with the lens projecting through the cover it fails to provide a snug fit between the lens and the cover. Due to the differential between the diameter of the meter lens and the cover aperture it is apparent that an annular open area will be left between the edges of the aperture and the lens whereby the interior of the cabinet will be accessible for the theft of current and also will allow the passage of moisture and dirt into the cabinet interior.

The cover aperture 46 is therefore of greater diameter than that of the meter glass 20, and as pointed out an annular open area will remain between the glass and the cover. To prevent the projection of wires or the like through this area and into the cabinet for connection into the electric circuit for the theft of current and, also to prevent the entrance of moisture and other foreign matter I have provided a meter positioning means disposed on the inside of the cover in the form of a meter ring plate 48 mounted to surround the aperture 46. The meter ring plate comprises a substantially rectangular flat member preferably formed of sheet steel or of some other sturdy rigid material, and I provide an annular opening 50 in the plate having a diameter slightly larger than the diameter of the meter glass but of less diameter than that of the aperture 46 provided in the cover 42.

The meter ring plate 48 is mounted on the inside of the cover 42 for universal movement relative thereto. The ring plate or collar forming member is slidably mounted on the cover by means of clips 52 which are welded at one end to the cover, the other end 53 of each of the clips being bent upwardly to project over the plate to movably retain it in position on the cover. To hold the plate in position and to keep it from falling downwardly when the cabinet is vertically mounted I provide at the lower corners thereof brackets 54 having plate holding flanges 56 on the lower edges thereof, the brackets 54 being screwed to or otherwise removably mounted on metallic or the like strips 55 forming base or supporting members for the brackets 54, the base members are preferably welded to the cabinet cover. It will thus be apparent that I have so mounted the meter ring plate to be movable in all directions relative to the cover 42 and that in its neutral or mid-position it is concentric with the opening 46 in the meter cover. Therefore, if the cover is placed over a cabinet which contains a meter mounted at an untrue angle to the bottom thereof, the annular edges of the meter ring plate will come into contact with the periphery of the meter glass and will be moved within its clips and brackets to allow the meter to project therethrough and through the aperture in the cover, in this position the annular surface of the meter ring plate will snugly fit against and about the meter to form in effect a meter glass surrounding collar. If it is desired, any form of sealing means such as a gasket may be disposed between the contacting surfaces of the meter ring plate and the meter glass to thereby effectively form a seal against the entrance of moisture or foreign matter into the cabinet.

So that meter ring plates or collars may be removed from their position within the clips I have so constructed my ring plate supporting means that the ring may be slid from under the supporting clips by merely unscrewing the end brackets 54 from their position on the base members 55. When this is done it is clear that the ring plate may be slid downwardly from beneath the clips 53.

For a purpose to be hereinafter explained and made clear I cut off one of the corners 57 of the ring plate 48, thereby providing one exterior edge of the plate extending diagonally to the adjacent longitudinal side of the cover 42. Reference particularly to Fig. 3 of the drawings will disclose that the omission of one right angle corner of the plate 48 provides a greater space between the depending flange 44 of the cover and the universally mounted plate. This structure is provided for a specific purpose and aids in the usefulness and operativeness of my design and arrangement.

Reference to Fig. 5 of the drawings will disclose the operation of the cover and ring plate when mounted on a cabinet containing a meter which is disposed in position therein off-center. Thus, the meter ring plate 48 as disclosed in this figure of the drawings has adapted itself to the untrue position of the meter glass 20 and has been moved thereby to position against the right clips 52, so that the periphery of the meter glass is snugly encompassed by the annular edges of the meter ring plate. Without the universal action of the meter ring plate under such circumstances a relatively large opening would occur between the edges of the aperture in the cover and the meter glass due to the necessity of providing an aperture in the cover larger than the meter for the purpose of taking care of the many variations which are usual in mounting meters in protective cabinets of this general type.

As I have hereinbefore stated it is essential in meter cabinet protective devices of the type herein disclosed to provide effective means for locking the cover on the cabinet to completely enclose the interior thereof. In view of the fact that a tremendous number of installations may be used by a utility company the expense of locking mechanisms is a detail of vital importance. With these factors in mind I have designed a simple and inexpensive means calculated to obtain the results desired and to require practically no repair or upkeep expense, and, furthermore, I have mounted such locking mechanism within the meter cabinet out of reach from the exterior thereof when the cabinet cover is locked in its closing position. To provide against the possibility of an unauthorized person unlocking and removing the cover from the cabinet in order to steal current therefrom in advance of the meter and then replacing the cover on the cabinet after having tampered in the interior thereof, I employ means disposed in the cover which are visible from the exterior of the cabinet and which must be broken and removed in order to release the locking mechanism for initial removal of the cover. It is, therefore, apparent that my cabinet closure cannot be removed and then replaced on the cabinet in apparently original condition without such removal and replacement being easily detectable from the exterior of the cabinet.

The cover locking mechanism which I utilize comprises a bracket 58 which is preferably welded to the cabinet end wall 18 on the inside thereof. The bracket 58 includes a pair of spaced bearing members which project into the cabinet and are provided with concentric openings therein to receive a horizontally mounted reciprocating locking bolt 62 which is releasably retained in forward locking position by means of a spring 64 coiled thereabout and retained under pressure between one bearing member 60 and a pin 61 which passes through the bolt. By this arrangement the compression spring is constantly urging the bolt forward toward its locking position. A further bolt supporting and bearing means 66 is provided which comprises a generally L-shaped member welded or otherwise secured to the inner surface of the bracket 58 between the bearing members 60, the projecting leg of the L-shaped member disposed in position parallel to the bearing member 60 and provided with an opening therein for receiving the bolt. Adjacent to but removed from the rear end of the bolt 62 which projects a distance rearwardly beyond the rear bearing member 60 I have formed a groove 68 extending about the circumference of the bolt. The purpose of this groove which is provided about the bolt will be more fully explained hereinafter and its connection with the locking mechanism clearly presented.

The arrangement of locking mechanism which I have described provides a spring actuated bolt mounted for reciprocal motion to locking and releasing position through a pair of spaced bearing members and a further bearing and supporting member. By so designing the locking mechanism I have devised a particularly sturdy arrangement which will effectively prevent the breaking of the bolt or the brackets by unauthorized persons who might attempt to prise the cover 42 from the cabinet by breaking the locking mechanism. Such locking mechanism insures against entry into the cabinet in any manner except by breaking the frangible member so that the unauthorized opening of the cabinet will be easily detectable from the exterior of the box.

The bolt 62 is adapted in its forward locking position to be received in an opening which is provided in a keeper 70 which is welded to the inner side of the cover 42 in position thereon to contact the forward end of the bolt when the cover is placed on the cabinet. The particular keeper which I have designed for cooperation with the locking mechanism comprises a member 72 projecting downwardly into the cabinet, the keeper being bent at its lower end to provide a cam-acting surface 74 which contacts the forward end of the locking bolt with a cam-action to force the bolt rearwardly against the action of the spring 64 until the cover has been brought downwardly to final position on the cabinet, whereupon the bolt under the forward urging action of the spring slips through the opening in the keeper to thereby securely lock the cover in position on the cabinet.

In placing the cover 42 in position for locking to the cabinet the clip 73 which is welded to the inside of the lower flange 44 of the cover is first placed in the slot 75 in the end wall 16 of the cabinet and the opposite end of the cover is then moved downwardly, the clip acting as a hinge. The keeper will abut against the forward end of the bolt and the cam surface thereon will move the bolt rearwardly until this end of the cover is in position on the cabinet whereupon the bolt will pass through the opening in the keeper and the cover will be locked on the cabinet. It is, of course, understood that the lower end of the cover cannot be removed from the cabinet due to the position of the clip in the slot until the locking mechanism at the opposite end has been released for cover removal.

The frangible member which is disposed in the cover at a position therein directly above the groove 68 in the bolt 62, comprises an annular disk 76 having an upstanding annular reduced portion or head 78 which in position in the cover is adapted to project into an opening provided therein. The reduced portion of the frangible member preferably has indicating means stamped or engraved on its outer face so that such markings will be visible from the exterior of the cabinet. The indicia on the face of the head may consist of the initials, trade-mark, or the like of the owner of the meter. The frangible member 76 and the reduced portion or head thereof are preferably made in one piece, formed of a material such as porcelain, glass, or the like for shattering and removal from the opening in the cover 42. I mount the frangible member in position in the cover by means of a supporting strip member 80 having a central aperture 82 formed therein directly beneath and in line with the opening in the cover through which the reduced portion 78 of the frangible member projects, the strip for holding the frangible member in position is secured to the inside of the cover by means of screws 84 which pass through the plate and are screwed into the base members 86 which are welded to the underside of the cover. Reference to Figs. 4 and 7 of the drawings will particularly disclose the formation of the under or base side 88 of the frangible member 76 which is concave in shape to provide a frangible member which will shatter more easily when a blow is directed against the face of the head 78. By forming the base of the disk 76 of concave shape its entire surface will not rest on strip 80, the edges thereof will receive the pressure of a blow and the member will be more responsive to a blow on the outer face of the head.

With the cover in position on the cabinet and the frangible member mounted on the cover so that the reduced annular portion thereof projects through the opening in the cover the cabinet can only be opened by shattering the glass or porcelain member and removing it from the opening in the cover. As such meter cabinets are usually mounted in vertical position upon a wall or similar structure the shattered fragments of the frangible member will fall under the action of gravity to the bottom of the cabinet. In order to provide a space through which the fragments may fall I have cut off the adjacent corner of the universally mounted plate 48 as disclosed at 57 and as hereinbefore explained. It is, therefore, apparent that a passageway along the underside of the cover results from this construction between the depending flange 44 and the meter ring plate for the removal of fragments of the shattered frangible member. When the frangible member has been removed by shattering from its position within the cover of the cabinet the bolt 62, and particularly the groove 68 therein will be accessible through the opening in the cover which has been freed of the head 78, and through aperture 82 in the frangible member holding strip 80, so that a forked key or the like instrument may be inserted through these openings and into the groove 68 for the purpose of retracting and releasing the bolt from the keeper 72 for complete removal of the cover from the cabinet.

Hence, if the frangible member is shattered and removed from the cover and the bolt is retracted to release the cover from the cabinet for unauthorized purposes and then the cover is replaced on the cabinet it will be apparent to an inspector of the company owning the meter that the cabinet has been tampered with, such tampering being detectable to the inspector due to the absence in the cover of the exteriorly visible reduced or head portion of the frangible member. In order to discourage and make more difficult the counterfeiting of frangible members for insertion in position in the cover after an unauthorized removal thereof, I have conceived the idea of embossing or stamping indicia on the visible surface of the reduced portion of the frangible member, thus an inspector seeing a frangible member in position in the cover but lacking the proper indicia thereon will be advised of the fact that the cabinet has been tampered with.

It is, of course, to be understood that an agent of the owner of the meter and cabinet who desires to obtain entry into the interior of the cabinet will shatter the frangible member and release the lock by a key and then will replace a new properly marked frangible member in position within the cover before replacing the cover in locked position upon the cabinet.

As a modified form of my invention which particularly refers to the construction of the means for providing a snug fitting collar to encompass the meter glass or lens I provide an annular flange 90 which is welded on the outside of the cover 42. The annular flange is positioned on the cabinet cover so as to encircle the opening 46 which is provided in the cover and is adapted to receive therein for sliding movement in all directions an annular ring or collar 47 of a diameter less than the diameter of the aperture 46 which is provided in the cover. The diameter of the collar 47 is slightly greater than the diameter of the meter glass so that it will encompass the glass and provide a snug fit thereabout to perform the same functions in the same manner as the meter ring plate 48 which has already been described. As the annular flange 90 which is mounted on the outside of the cover provides a continuous unbroken member it will be apparent that the collar which is disposed thereunder cannot be removed from the cover without complete mutilation of the flange, such mutilation would, of course, be visible from the exterior of the cabinet, and would furthermore, be extremely difficult to accomplish. It is, of course, within the contemplation of this form of my invention to construct the flange 90 of various shapes and dimensions to conform to the aperture 46 in the cover 42, the shape of the latter being dependent upon the shape of the lens portion of the particular meter which is installed within the cabinet. It will be seen that the construction of this modified form of meter positioning means will be as tamper-proof as the preferred embodiment thereof which is mounted on the inner side of the cover and will operate effectively in fixing its position relative to a meter which may be set off-center within the cabinet.

The meter cabinet of this invention presents a completely tamper-proof meter protective device, the construction being of a type wherein all elements which are secured to either the cabinet or the cover are welded thereto so that no parts thereof will extend through the box or cover for unauthorized punching out or removal. Means have been utilized whereby parts which must be mounted for removal are secured to additional elements which are themselves welded to either the cabinet or the cover.

It is within the scope and contemplation of my invention to provide means for shutting off the interior of a cabinet when no meter is mounted therein, such for instance, as when a house or building is closed and not being electrically served. When such a situation exists I propose using a cover which is not provided with an aperture therein for receiving a meter lens but one which is provided with a completely blank face to entirely shut off the interior of the cabinet, or if for any reason it is more practical or desirable to utilize an aperture cover then I propose using a meter ring plate which is solid and not apertured to thereby close the cover aperture and completely shut off the interior of the cabinet.

What I claim is:

1. Sealing means for a locking mechanism of the key actuated type and provided with a keyhole, said means comprising a substantially annular disk-like frangible element having the lower surface thereof concave in cross section to provide an element having a relatively thin central area, the element being formed to gradually increase in thickness radially therefrom to the periphery where the element is of greatest thickness, said element having an upper plane surface, adapted when the element is in normal position to lie flush against the surface in which the keyhole is formed, and a head formed integral with said element and of relatively small area as compared with the element, and said head disposed concentrically with respect to the element to extend from said upper plane surface of the element at its relatively thin central area for insertion in the keyhole, and the thick peripheral portion of said element adapted to seat on a removable strap provided for supporting the element in normal position.

2. Sealing means for a locking mechanism of the key actuated type and provided with a keyhole, said means comprising a disk-like frangible element having a relatively thin central area and formed to gradually increase in thickness from said central area toward the periphery of the element, said element having a plane upper surface, a head of relatively small area as compared with said element disposed thereon to extend from the relatively thin central area for insertion in the keyhole and the periphery of the element adapted to seat on a removable strap provided for supporting the element.

JACOB B. COOPER.